United States Patent
Zhou et al.

(10) Patent No.: US 11,196,471 B2
(45) Date of Patent: *Dec. 7, 2021

(54) MULTI-BEAM SIMULTANEOUS TRANSMISSIONS

(71) Applicant: QUALCOMM Incorporated, San Diego, CA (US)

(72) Inventors: Yan Zhou, San Diego, CA (US); Makesh Pravin John Wilson, San Diego, CA (US); Tao Luo, San Diego, CA (US); Kiran Venugopal, Raritan, NJ (US); Tianyang Bai, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,071

(22) Filed: Feb. 28, 2020

(65) Prior Publication Data

US 2020/0204236 A1 Jun. 25, 2020

Related U.S. Application Data

(63) Continuation of application No. 16/453,251, filed on Jun. 26, 2019.

(60) Provisional application No. 62/692,640, filed on Jun. 29, 2018.

(51) Int. Cl.
*H04B 7/06* (2006.01)

(52) U.S. Cl.
CPC .......... *H04B 7/0617* (2013.01); *H04B 7/063* (2013.01); *H04B 7/0634* (2013.01)

(58) Field of Classification Search
CPC ..... H04B 7/0617; H04B 7/063; H04B 7/0634
USPC ........................................................ 375/267
See application file for complete search history.

(56) References Cited

U.S. PATENT DOCUMENTS

| | | | |
|---|---|---|---|
| 2013/0072243 A1 | 3/2013 | Yu et al. | |
| 2013/0223251 A1 | 8/2013 | Li et al. | |
| 2019/0103908 A1* | 4/2019 | Yu | H04B 7/0851 |
| 2019/0141693 A1* | 5/2019 | Guo | H04L 5/0053 |
| 2019/0297637 A1* | 9/2019 | Liou | H04W 72/1289 |
| 2020/0007208 A1 | 1/2020 | Zhou et al. | |
| 2020/0220605 A1* | 7/2020 | Xu | H04W 56/001 |
| 2020/0280409 A1* | 9/2020 | Grant | H04L 5/0044 |

FOREIGN PATENT DOCUMENTS

WO 2019097478 A1 5/2019

OTHER PUBLICATIONS

International Search Report and Written Opinion—PCT/US2019/039572—ISA/EPO—dated Sep. 12, 2019.

(Continued)

*Primary Examiner* — Ted M Wang
(74) *Attorney, Agent, or Firm* — Patterson + Sheridan, L.L.P.

(57) ABSTRACT

Certain aspects of the present disclosure provide techniques for transmitting simultaneous multi-beams on the same wireless resource. One example method includes determining a set of transmission (TX) beams for simultaneous transmissions to or from a user equipment (UE), signaling to the UE an indication of the TX beams, and transmitting simultaneously via the TX beams.

23 Claims, 12 Drawing Sheets

(56) References Cited

OTHER PUBLICATIONS

Nokia et al., "Multi-Beam Common Control Plane Design", 3GPP Draft; R1-1610247, 3rd Generation Partnership Project (3GPP), Mobile Competence Centre; 650, Route Des Lucioles; F-06921 Sophia-Antipolls Cedex; France, vol. RAN WG1, No. Lisbon, Portugal; Oct. 10-Oct. 14, 2016, Oct. 9, 2016, XP051150265, Retrieved from the Internet: URL:http://www.3gpp.org/ftp/Meetings_3GPP_SYNC/RAN1/Docs/ [retrieved on Oct. 9, 2016], 5 pages, p. 1, 1 Introduction, Agreements.

NTT Docomo: "Views on NR Beam Management", 3GPP Draft; R1-1720803 Beam Management, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 27-Dec. 1, 2017, Nov. 18, 2017 (Nov. 18, 2017), XP051370232, 11 Pages, Retrieved from the Internet: URL:http://www.3gpp.org/ftp/tsg%5Fran/WG1%5FRL1/TSGR1%5F91/Docs/ [retrieved on Nov. 18, 2017] p. 3, Figure 3, 3. General procedure for DL beam Management, 4. Reference signal for downlink beam management.

\* cited by examiner

MULTI-BEAM SIMULTANEOUS TRANSMISSIONS

CROSS-REFERENCE TO RELATED APPLICATIONS

The present application for patent is a continuation of U.S. Non-Provisional application Ser. No. 16/453,251, filed Jun. 26, 2019, which claims priority to U.S. Provisional Application No. 62/692,640, filed Jun. 29, 2018, each of which is assigned to the assignee of the present application and hereby expressly incorporated by reference herein in its entirety.

BACKGROUND

Field of the Disclosure

Aspects of the present disclosure relate to wireless communications, and more particularly, to techniques for configuring multi-beam simultaneous transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved configuration of multi-beam simultaneous transmissions by signaling quasi co-location assumptions for the transmission beams.

Certain aspects provide a method for wireless communication by a base station (BS). The method generally includes determining a set of transmission (TX) beams for simultaneous transmissions to or from a user equipment (UE), signaling to the UE an indication of the TX beams, and transmitting simultaneously via the TX beams.

Certain aspects provide a method for wireless communication by a user equipment (UE). The method generally includes receiving, from a base station (BS), an indication of transmission (TX) beams for simultaneous transmissions to or from the UE, and receiving transmissions based on the indication via one or more reception (RX) beams.

Certain aspects provide a method for wireless communication by a BS. The method generally includes signaling, to a UE, an indication of a plurality of transmission configuration indicator (TCI) states associated with antenna ports to be used to transmit channel state information reference signals (CSI-RSs) simultaneously via transmission (TX) beams, and transmitting, to the UE, simultaneously the CSI-RSs via the TX beams.

Certain aspects provide a method for wireless communication by a UE. The method generally includes receiving, from a BS, an indication of a plurality of transmission configuration indicator (TCI) states associated with antenna ports to be used to transmit channel state information reference signals (CSI-RSs) simultaneously via transmission (TX) beams, and receiving, from the BS, simultaneously the CSI-RSs via one or more reception (RX) beams.

Aspects of the present disclosure also provide various apparatuses, means, and computer program products corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
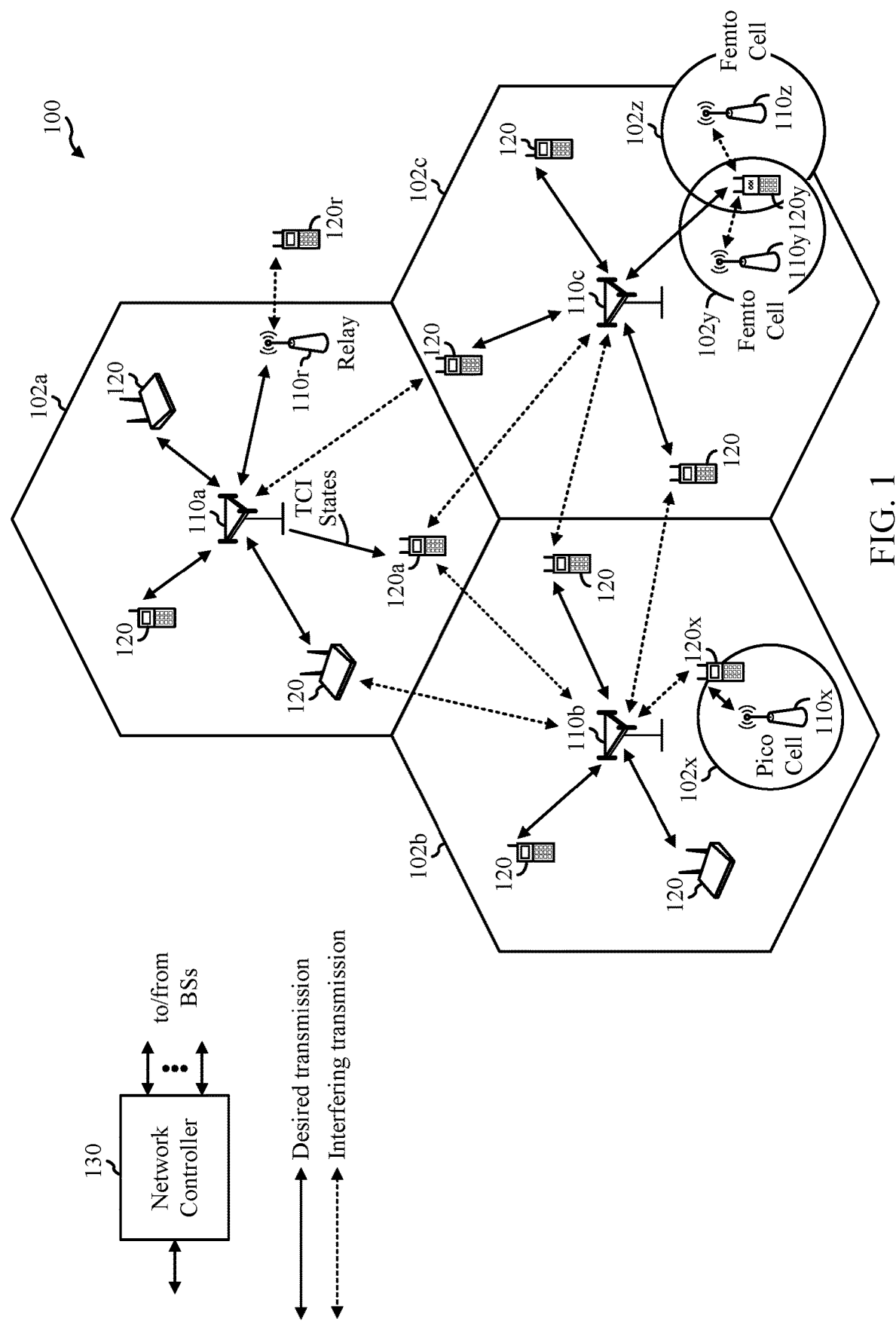
FIG. 1 is a block diagram conceptually illustrating an example telecommunications system, in accordance with certain aspects of the present disclosure.

Aspects of the present disclosure relate to signaling quasi co-location (QCL) assumptions for multi-beam simultaneous transmissions. In certain aspects, a base station may determine a set of transmission beams for simultaneous transmissions to a user equipment. The base station may signal, to the user equipment, QCL assumptions associated with the transmission beams. The user equipment may determine, based on the indication, the transmission beams indicated and receive transmissions from the base station via the transmission beams, based on the QCL assumptions. In other aspects, the base station may signal, to the user equipment, QCL assumptions associated with antenna ports to be used to transmit channel state information reference signals (CSI-RSs) simultaneously via transmission beams.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. In certain aspects, the wireless communication network 100 may be a NR or 5G network that performs multi-beam simultaneous transmissions as further described herein. For example, the base station 110a may signal, to the user equipment 120a, QCL assumptions (such as transmission configuration indicator (TCI) states) for transmission (TX) beams. The user equipment 120a may determine the TX beams based on the TCI states and receive multi-beam simultaneous transmissions via one or more reception (RX) beams, as further described herein with respect to FIGS. 7 and 8. In other aspects, the base station 110a may signal, to the user equipment 120a, TCI states associated with antenna ports to be used to transmit channel state information reference signals (CSI-RSs) simultaneously via TX beams, as further described herein with respect to FIGS. 9 and 10.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells.

In some examples, access to the air interface may be scheduled, wherein a scheduling entity (e.g., abase station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
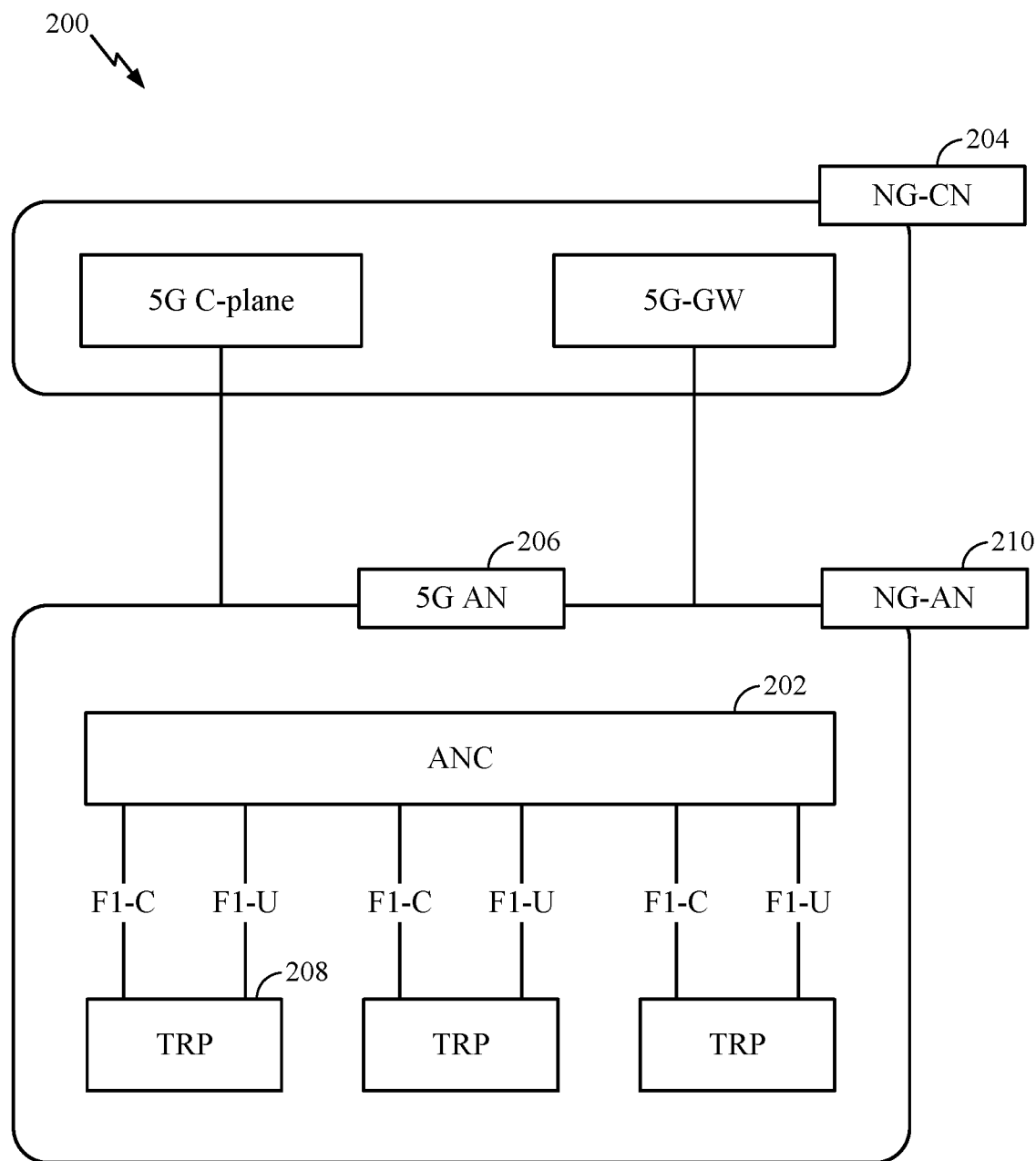
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
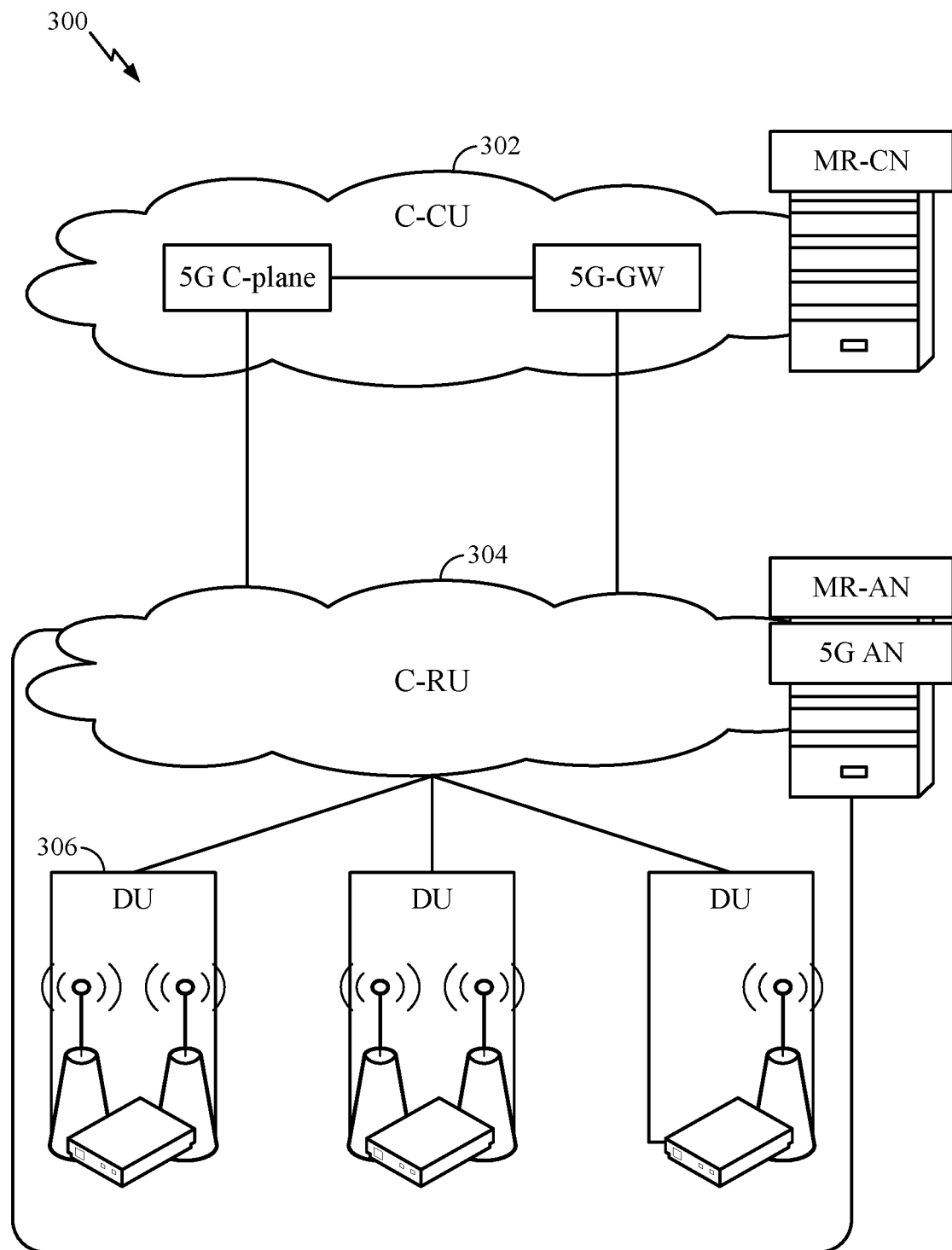
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
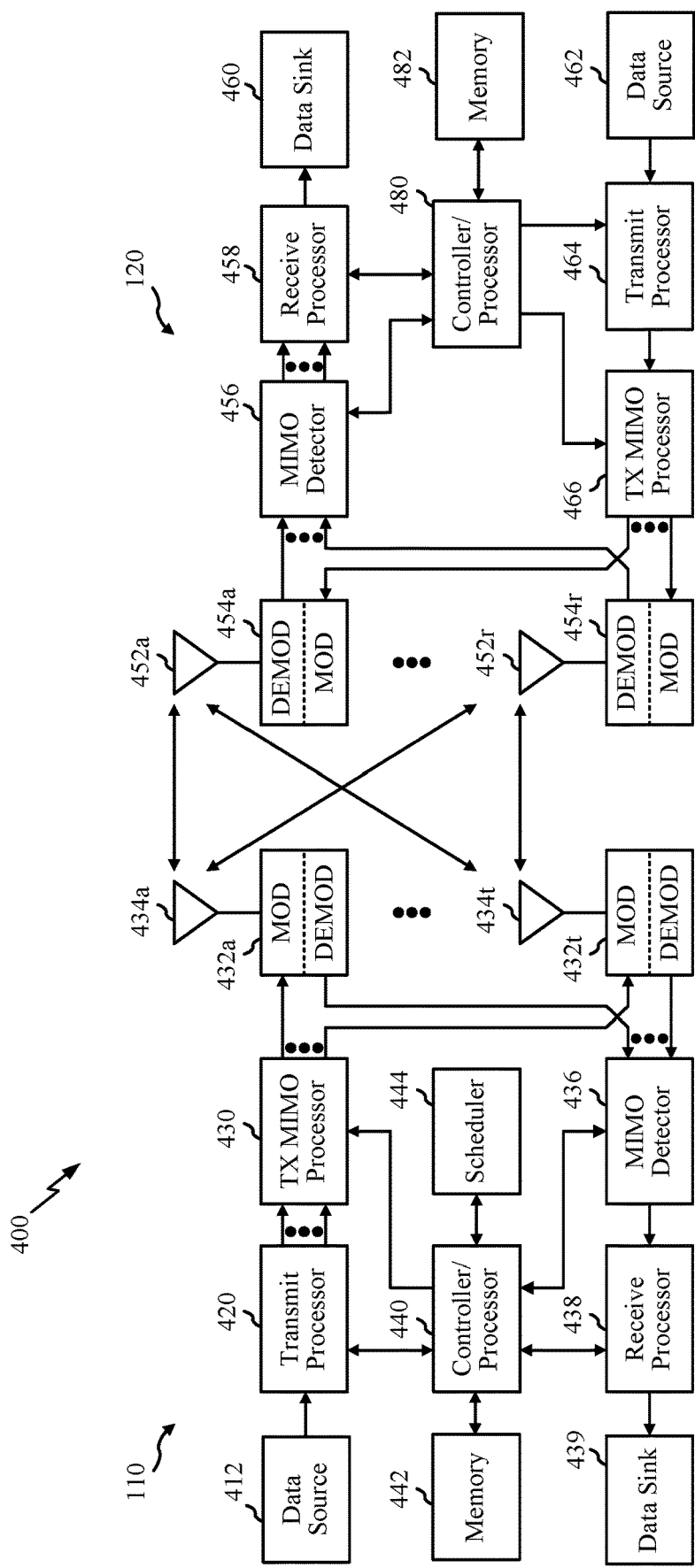
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein, for example, the operations described herein and illustrated in FIGS. 7-10.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
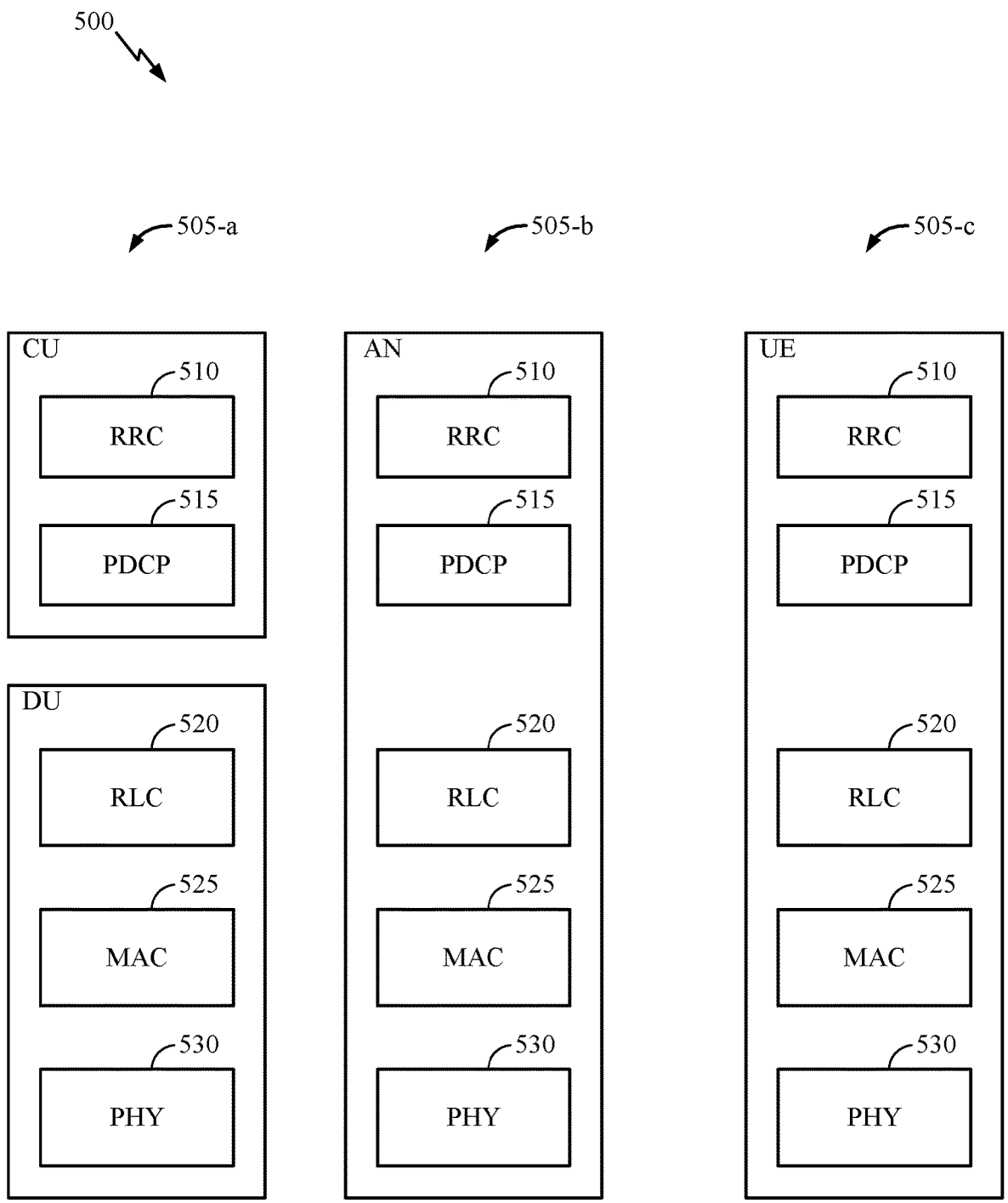
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., TRP 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
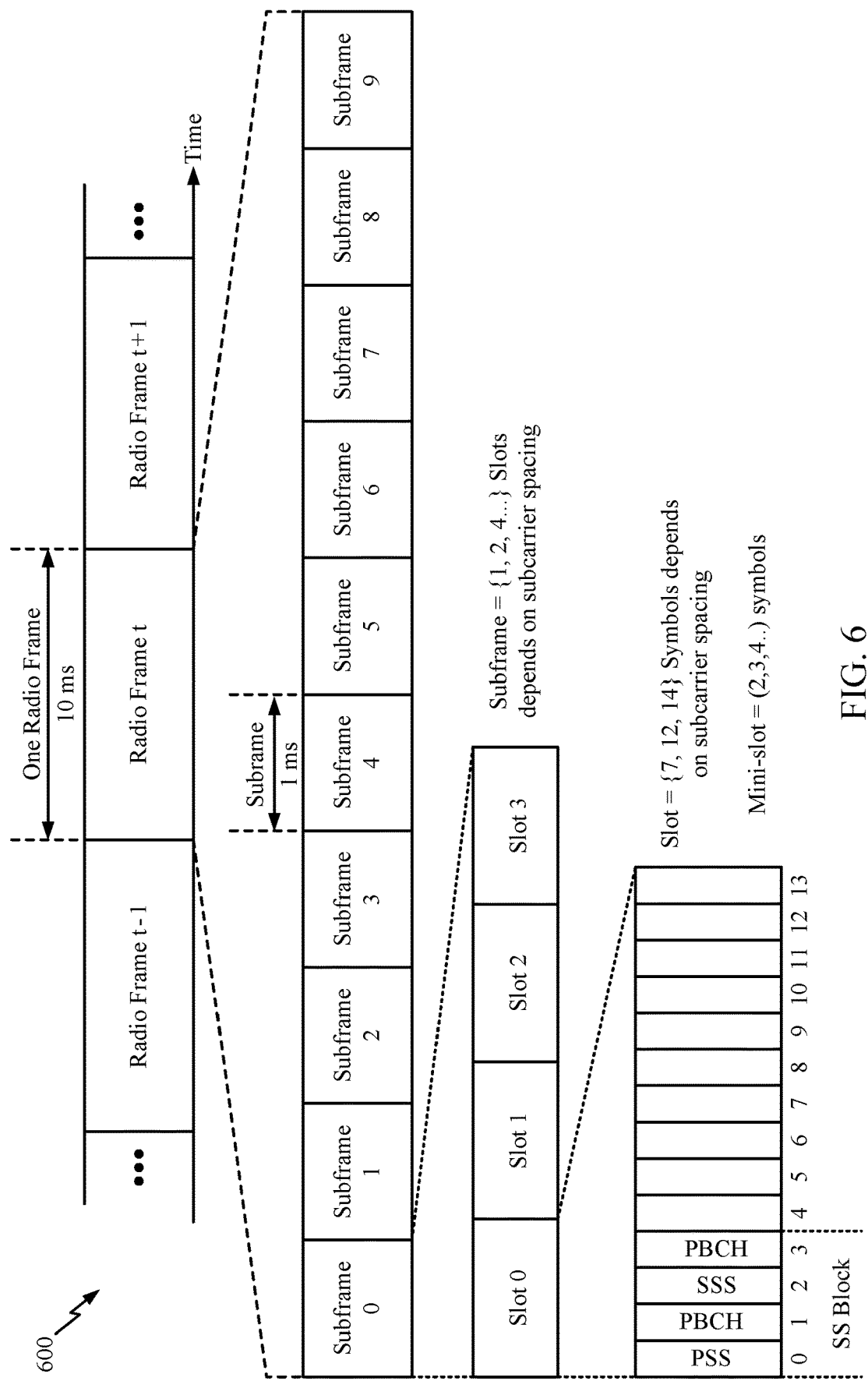
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Multi-Beam Simultaneous Transmissions

For certain wireless communication networks (e.g., 5G NR wireless networks), a UE may be configured to receive and/or transmit multiple beams simultaneously (also referred to herein as multi-beam simultaneous transmissions or multi-beam transmissions) on the same wireless resource. Multi-beam transmissions improve the robustness of the wireless network with regard to UE rotation, beam blockage, beam fading, or other factors that may influence the signal quality of a beam. For example, in cases where the signal quality of one beam weakens, a BS may continue to communicate with the UE via a stronger second beam seamlessly during simultaneous multi-beam transmissions. As further described herein, quasi co-location (QCL) assumptions (also referred to herein as transmission configuration indicator (TCI) states) may be provided to the UE using various indications of the transmit (TX) beams, which enable the UE to receive or transmit multi-beams.

QCL assumptions generally refer to assumptions that, for a set of signals or channels considered to be QCL related (or simply "QCL'd" for short), certain characteristics derived for (measured from) one of the signals or channels may be applied to the other. As an example, if a transmission (TX) beam is QCL'd with another transmission beam, a UE may process the TX beam based on measurements of the other TX beam. In some cases, this may lead to more efficient processing, allowing a UE to use (re-use) previous measurements of the QCL'd RS, which may improve processing of a current channel.

In some cases, QCL assumptions for receptions/transmissions of signals and channels may be signaled via a mechanism referred to as TCI states. In some cases, a UE may be configured with various TCI states via radio resource control (RRC) signaling, while one of the actual TCI states may be indicated by an N bit downlink control information (DCI) field for the PDSCH.

Figure 7:
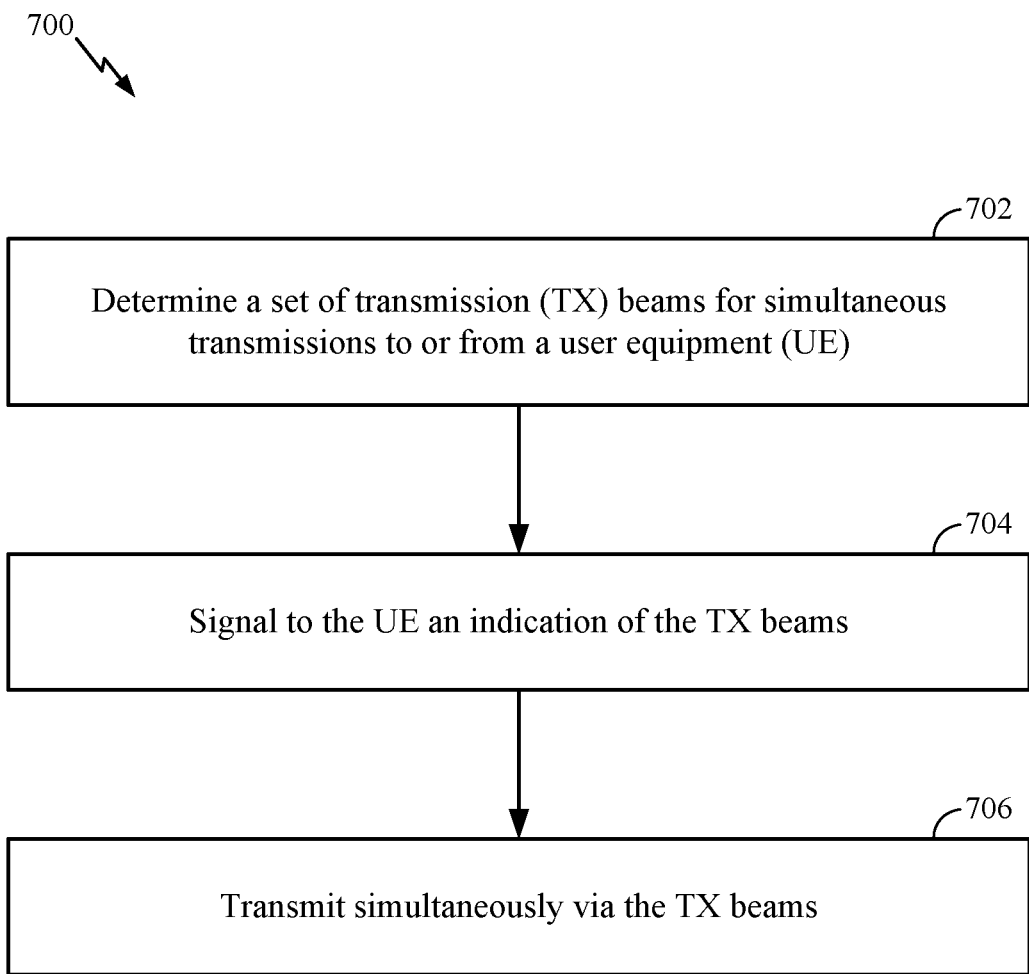
FIG. 7 is a flowchart illustrating example operations of wireless communications, in accordance with certain aspects of the present disclosure.

FIG. 7 is a flow diagram illustrating example operations 700 that may be performed, for example, by a BS (e.g., BS 110), for indicating a multi-beam configuration to a UE, in accordance with certain aspects of the present disclosure.

The operations 700 begin, at 702, where the BS determines a set of transmission (TX) beams for simultaneous transmissions to or from a UE (e.g., UE 120). At 704, the BS signals to the UE an indication of the TX beams. At 706, the BS transmits simultaneously via the TX beams.

Figure 8:
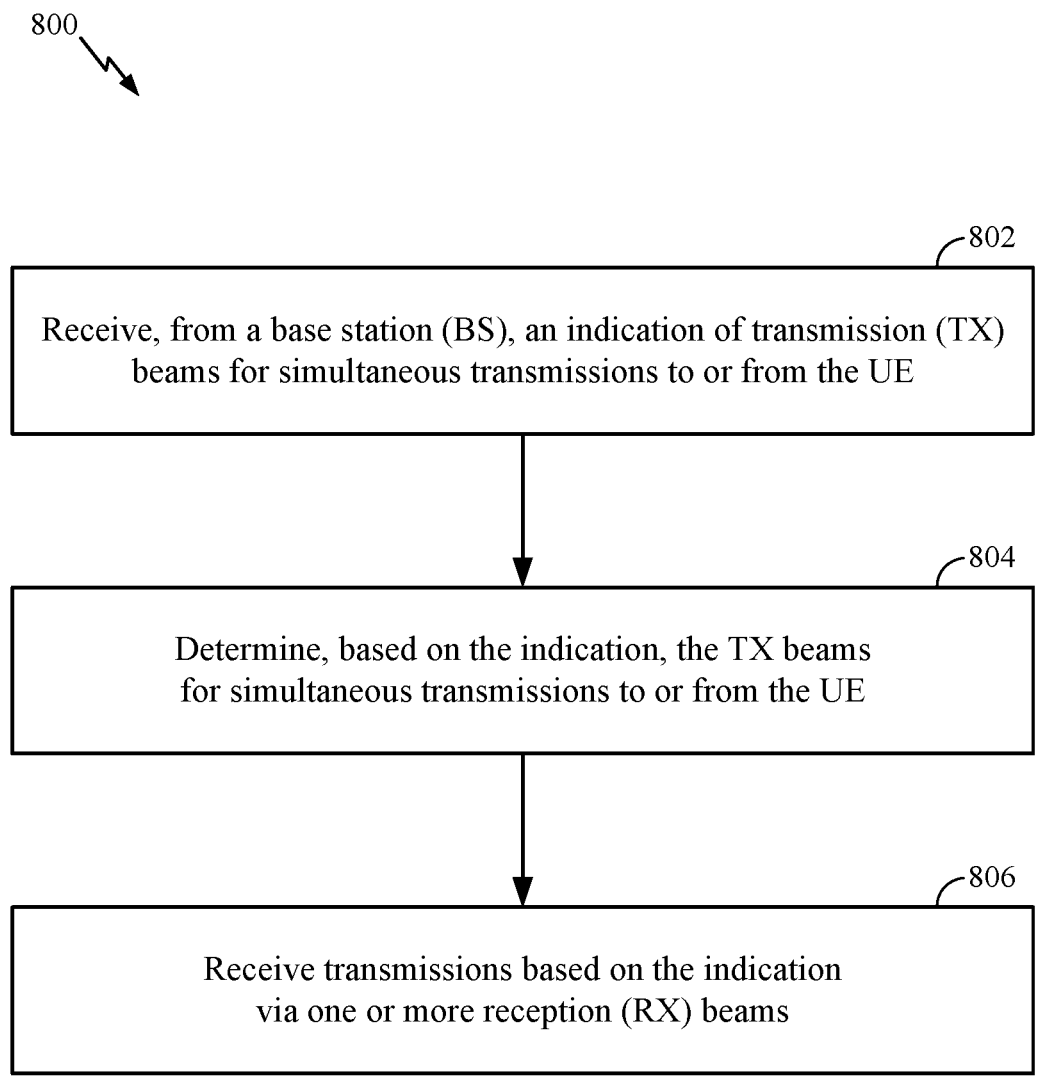
FIG. 8 is a flowchart illustrating example operations of wireless communications, in accordance with certain aspects of the present disclosure.

FIG. 8 is a flow diagram illustrating example operations 800 that may be performed, for example, by a UE (e.g., UE 120), for indicating a multi-beam configuration to a UE, in accordance with certain aspects of the present disclosure.

The operations 800 begin, at 802, where the UE receives, from a BS (e.g., BS 110), an indication of transmission (TX) beams for simultaneous transmissions to or from the UE. At 804, the UE determines, based on the indication, the TX beams for simultaneous transmissions to or from the UE. At 806, the UE receives transmissions based on the indication via one or more reception (RX) beams.

In certain aspects, the indication of the TX beams may be provided via a multi-beam TCI state that indicates TX beams for simultaneous transmission on the same resource, e.g., control-resource set (CORESET), PDCCH, or PDSCH. The multi-beam TCI state may be selected and/or activated via downlink control signaling such as control field in a DCI message. The multi-beam TCI state may include QCL relationships for one or more of the TX beams, including QCL spatial reception parameters (e.g., QCL type D information). Each multi-beam TCI state may provide one or more identifiers corresponding to a set of TX beams, enabling the use of a single-beam TCI state that corresponds to the set of TX beams. For example, the BS may signal, to the UE, an indication of the multi-beam TCI state including an identifier that corresponds to multiple TX beams from a common set of TX beams (e.g., a common TCI state identifier pool). In certain aspects, the identifier may be one or more single-beam TCI state identifiers. The multi-beam TCI state may provide an identifier of a single-beam TCI state for determining spatial reception parameters associated with the TX beams (e.g., QCL spatial reception parameters).

In certain aspects, the UE may determine feedback information related to the TX beams based on the indication and transmit, to the BS, the feedback information related to the TX beams. For example, the indication of the TX beams may provide an indication to the UE to generate a group-based feedback report for the TX beams. For example, based on the set of TX beams indicated by the multi-beam TCI state, the UE receives multi-beam simultaneous transmissions with RX beams and generates a group-based feedback report for the same set of TX beams. The feedback report may include QCL information such as spatial parameters, Doppler shift, Doppler spread, average delay, delay spread, or any combination thereof. The group-based feedback report may also include other feedback (such as a channel quality indicator (CQI), precoding matrix indicator (PMI), CSI-RS resource indicator (CRI), layer indicator (LI), rank indicator (RI), or a reference signal received power (RSRP)) associated with the group of TX beams, which can be received simultaneously by one or more RX beams by the UE.

In certain aspects, the indication of the TX beams may be provided by indications of at least one first reference signal for determining spatial reception parameters associated with the TX beams and/or at least one second reference signal for tracking the TX beams (also referred to herein as a tracking reference signal (TRS)). The reference signals may be indicated by an index or identifier corresponding to resources assigned to downlink reference signals (e.g., PDCCH). The first reference signal(s) may be used by the UE to determine QCL spatial reception parameters (e.g., QCL Type-D information, beam shape, angle of departure (AoD) from a transmitter, etc.). The second reference signal(s) may be used by the UE to determine beam tracking parameters (e.g., QCL Type-A information, QCL-Type-B information, QCL Type-C information, Doppler shift, Doppler spread, average delay, delay spread, or any combination thereof).

In certain aspects, the indication of the TX beams may be provided by indications of a single-beam TCI state having indications of the TX beams that can be simultaneously received by the UE and/or at least one TRS for multi-beam transmissions. For example, the multi-beam TCI state may provide an identifier of a single-beam TCI state for determining spatial reception parameters associated with the TX beams (e.g., QCL spatial reception parameters) and/or an identifier of at least one TRS.

In certain aspects, the indication of the TX beams may be provided by indications of a multi-beam TCI state identifier, which corresponds to a group based report, and/or at least one tracking reference signal for multi-beam transmissions. For example, the multi-beam TCI state may provide an identifier of a multi-beam TCI state for determining spatial reception parameters associated with the TX beams (e.g., QCL spatial reception parameters) and/or an identifier of at least one TRS.

In certain aspects, the indication of the TX beams may be provided by a virtual TCI state or a TCI codepoint. In aspects, an example of a virtual TCI state may be a TCI code point associated with a set of single-beam TCI states. The virtual TCI state or TCI codepoint may indicate a set of single-beam TCI states corresponding to each of the TX beams. The virtual TCI state or TCI codepoint may be signaled by the BS to the UE via downlink control signaling such as a control field in a DCI message.

Based on the TX beams indicated by single-beam TCI states for a virtual TCI state or TCI codepoint, the UE receives corresponding multi-beam simultaneous transmission with RX beams and generates a group-based feedback report for the set of TX beams. For certain aspects, where TX beams are simultaneously received by each RX beam in a group report, each RX beam uses the TRS associated with the single-beam TCI state to determine beam tracking parameters (e.g., average delay, Doppler spread, delay spread) per TX beam. The UE may determine the beam tracking parameters for the group by combining the parameters for each TX beam. In certain aspects, the beam tracking parameters are determined based on the received TRS for each RX beam. In other aspects, the beam tracking parameters may be determined using a combination of RX beams and TX beams.

For certain aspects, the TRSs may include a common reference signal transmitted by each of the TX beams. In other aspects, the TRSs may be transmitted for each RX beam. That is, the TRSs may include a reference signal for each set of TX beams simultaneously received by a same RX beam at the UE. The UE may use QCL assumptions based on the TRS for the TX beams received by the same RX beam. For aspects, the TRSs may be transmitted based on a combination of TX beams and RX beams.

As an example, suppose the BS configures the UE to receive three TX beams (BS-B1, BS-B2, and BS-B3), and the UE is configured to receive two of the beams (BS-B1 and BS-B2) via one reception beam (UE-B1) and the other beam (BS-B3) via another reception beam (UE-B2). Under a scenario where the TRSs are transmitted for each of the TX beams, the UE, in this example, receives three TRSs. Under the scenario where the TRSs are transmitted for each of the RX beams, the UE receives, in this example, two TRSs.

For aspects where the TRSs are transmitted based on the RX beams, the UE may signal to the BS an indication of which TX beams can be received by the same RX beam, a corresponding TX beam sub-group index, or RX beam index in the group-based feedback report. This enables the BS to know which RSs to transmit for each RX beam. The BS may provide the UE with identifiers for TRSs sent by each TX beam that correspond to the TX beams received by the same RX beam, or an indication of an identifier of TRSs per TX beam sub-group index or RX beam index.

In certain aspects, the indication of the TX beams may provide multi-beam spatial relation information to configure the UE for multi-beam transmissions on the same UL resource (e.g. PUCCH, SRS). The multi-beam spatial relationship information may provide indications of at least one reference signal for determining QCL spatial parameters and at least one reference signal for estimating a path loss for power control associated with an UL multi-beam simultaneous transmission. Based on the TX beams indicated by the multi-beam spatial relationship information, the UE may transmit, for example to the BS, multi-beam simultaneous transmissions on the same UL resource.

Figure 9:
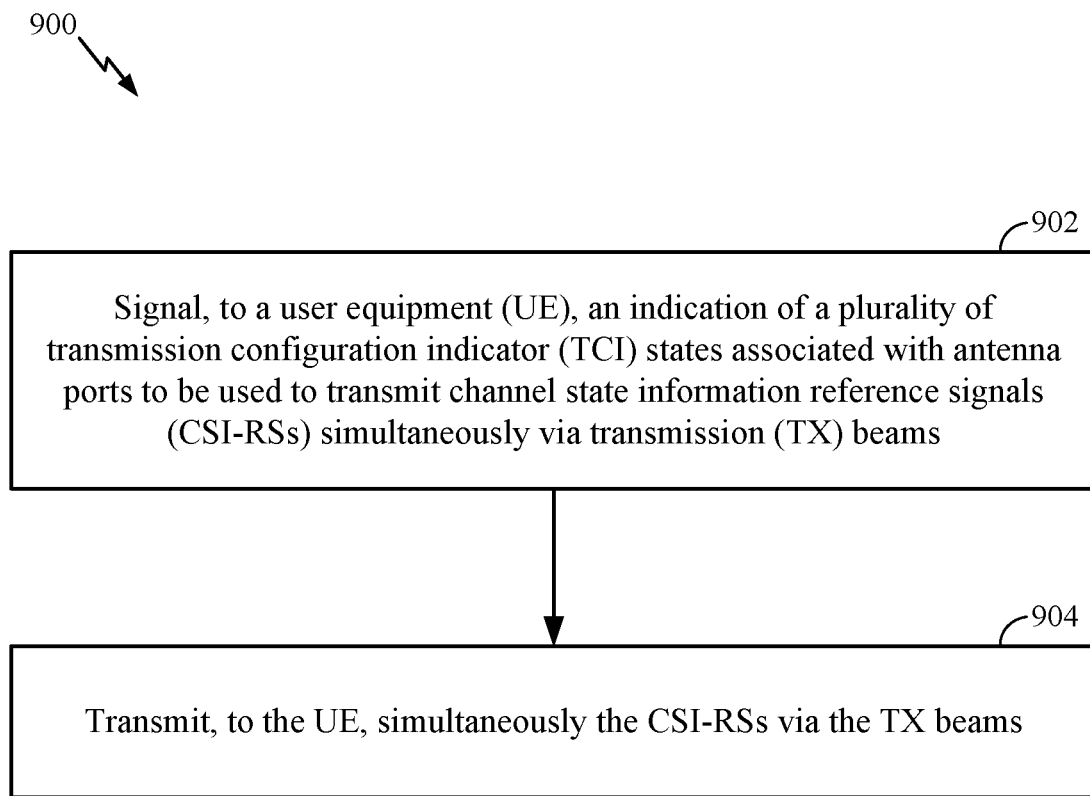
FIG. 9 is a flowchart illustrating example operations of wireless communications, in accordance with certain aspects of the present disclosure.

In certain aspects, the BS may configure the UE with different subsets of antenna ports for channel-state information reference signals (CSI-RS) and a plurality of TCI states per CSI-RS. FIG. 9 is a flow diagram illustrating example operations 900 that may be performed, for example, by a BS (e.g., BS 110), for indicating multiple TCI states per CSI-RS, in accordance with certain aspects of the present disclosure.

The operations 900 begin, at 902, where the BS signals, to a UE (e.g., UE 120), an indication of a plurality of transmission configuration indicator (TCI) states associated with antenna ports to be used to transmit channel state information reference signals (CSI-RSs) simultaneously via transmission (TX) beams. At 904, the BS transmits, to the UE, simultaneously the CSI-RSs via the TX beams.

Figure 10:
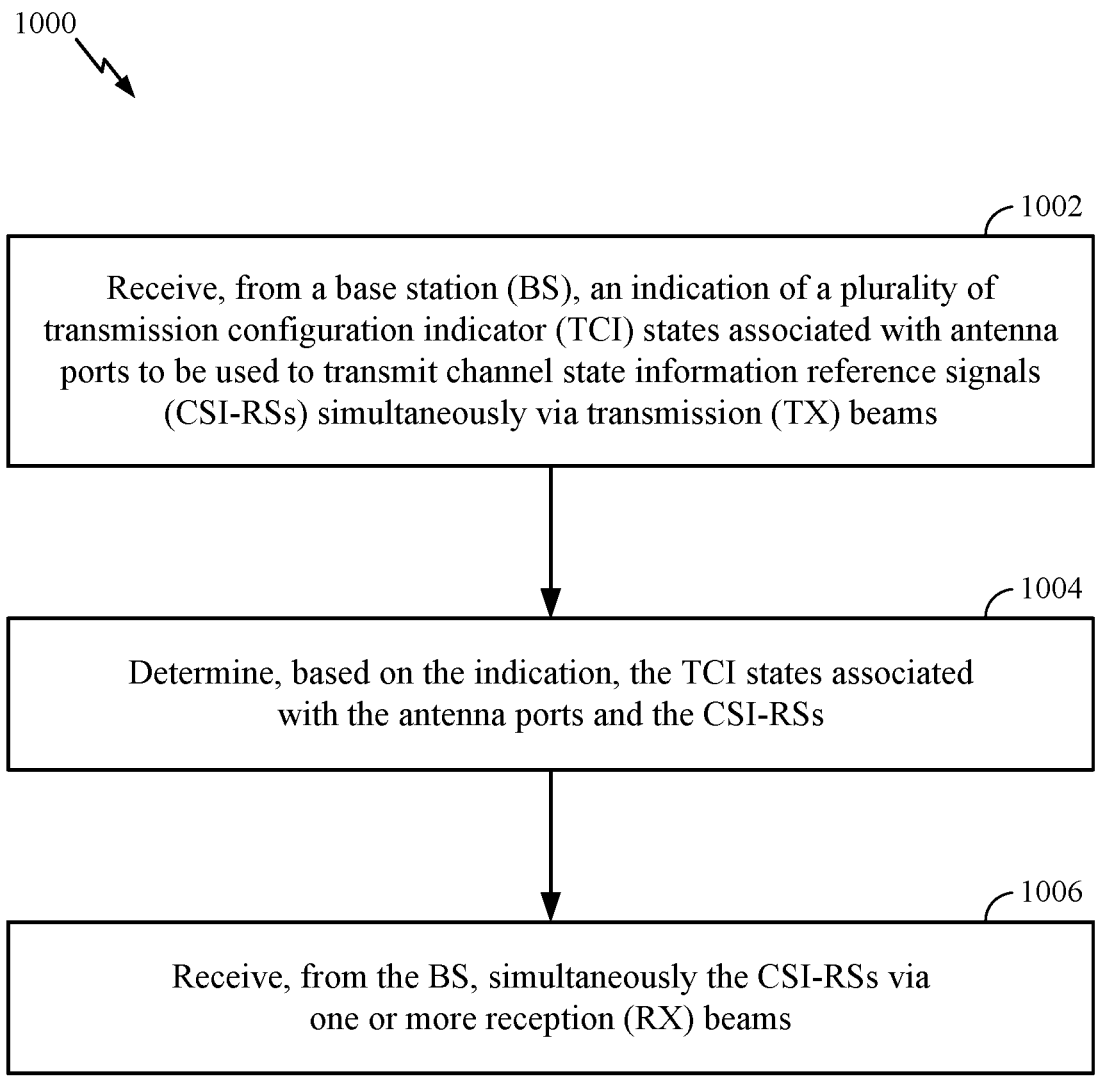
FIG. 10 is a flowchart illustrating example operations of wireless communications, in accordance with certain aspects of the present disclosure.

FIG. 10 is a flow diagram illustrating example operations 1000 that may be performed, for example, by a UE (e.g., UE 120), for indicating multiple TCI states per CSI-RS, in accordance with certain aspects of the present disclosure.

The operations 1000 begin, at 1002, where the UE receives, from a BS (e.g., BS 110), an indication of a plurality of transmission configuration indicator (TCI) states associated with antenna ports to be used to transmit channel state information reference signals (CSI-RSs) simultaneously via transmission (TX) beams. At 1004, the UE determines, based on the indication, the TCI states associated with the antenna ports and CSI-RSs. At 1006, the UE receives, from the BS, simultaneously the CSI-RSs via one or more reception (RX) beams.

The BS may signal multiple TCI states associated with different subsets of antenna ports per CSI-RS, which are simultaneously transmitted by different TX beams. In certain aspects, the UE may determine feedback information based on the CSI-RSs and transmit, to the BS, the feedback information. The UE may determine CSI feedback based on the CSI-RSs associated with different TCI states and antenna ports. The BS may also configure the CSI feedback to be reported by the UE across the TX beams and TCI states. That is, the BS may signal an indication of the feedback information associated with the CSI-RSs. The CSI feedback may include, for example, RS rank and/or a pre-coding matrix indicator (PMI). For certain aspects, at least one of the TCI states may be different from another one of the TCI states. For aspects, transmitting the CSI-RSs may include transmitting the CSI-RSs via a CSI-RS resource with a corresponding resource identifier.

Figure 11:
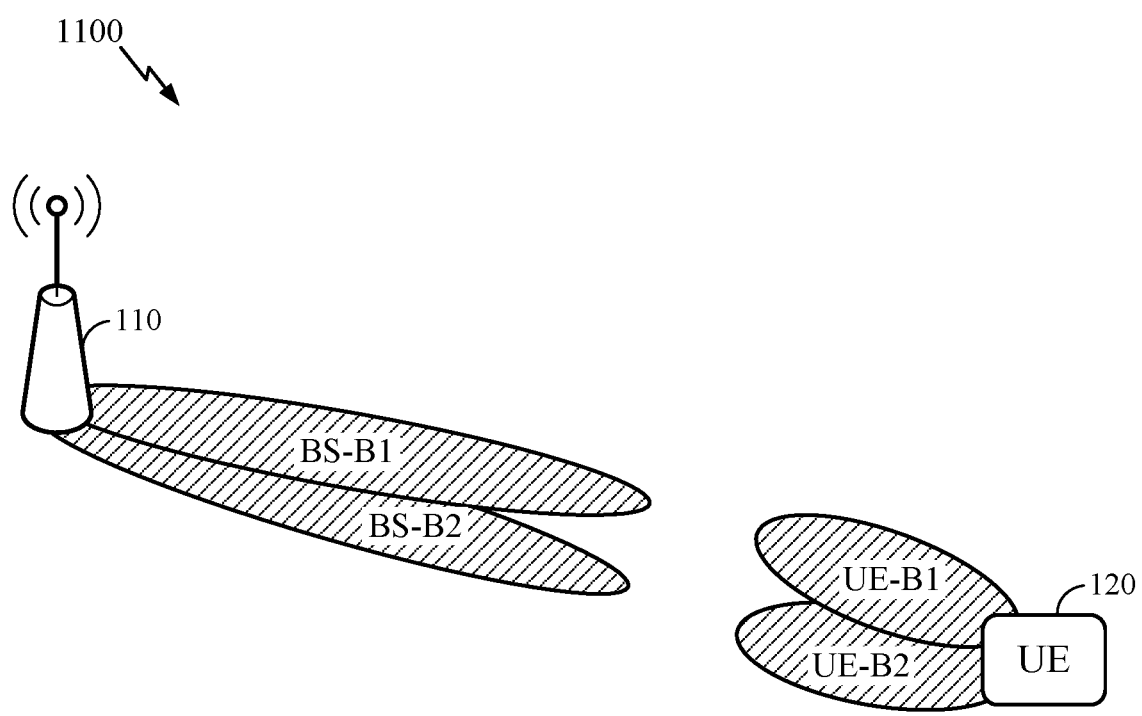
FIG. 11 illustrates an example multi-beam transmission, in accordance with certain aspects of the present disclosure.

FIG. 11 illustrates an example multi-beam transmission 1100, in accordance with aspects of the present disclosure. A BS and a UE may communicate using a set of active beams. Active beams may refer to BS and UE beam pairs (TX/RX beams) that are used to transmit data and control information. As illustrated in FIG. 11, the BS 110 may simultaneous transmit data and/or control information via the TX beams BS-B1, BS-B2 on the same resource (e.g., CORESET). The UE 120 may receive the simultaneous transmissions via one or more RX beams UE-B1, UE-B2. In other aspects, the UE 120 may also transmit simultaneous data and/or control information via TX beams UE-B1, UE-B2 as described herein.

In wireless communication systems employing beams, such as mmWave systems, high path loss may present a challenge. Accordingly, techniques including hybrid beamforming (analog and digital), which are not present in 3G and 4G systems, may be used in such wireless systems. Hybrid beamforming creates narrow beam patterns to wireless devices (e.g., UEs), which may enhance link budget/SNR. As described above, a BS and UE may communicate over active beams. Active beams may be referred to as serving beams. Active beams may include BS and UE beam pairs that carry data and control channels such as PDSCH, PDCCH, PUSCH, PUCCH, synchronization signals (SS), channel-state information reference signals (CSI-RS), sounding RS (SRS), phase-tracking RS (PTRS), time tracking RS (TRS).

A BS may monitor beams using beam measurements and feedback from a UE. For example, a BS may monitor active beams using DL reference signals. A BS may transmit a DL RS, such as a measurement reference signal (MRS), channel state information reference signal (CSI-RS), or a synchronization (synch) signal. A UE may report, to the BS, a reference signal receive power (RSRP) associated with a received reference signal. In this manner, the BS may monitor active beams.

Sets of active beams may have different functionalities, characteristics, and requirements. Stated otherwise, the functionalities of one or more active beams may be different than the functionalities other active beams. For example, a first set of active beams may include control beam and a second set of active beams may include data transmissions. As another example, beams in a first set of active beams may be transmitted in a first direction and beams in a second set of active beams may be transmitted in a second direction, different than the first direction. During multi-link communication, a UE may simultaneously be connected to a first BS in the first direction and to a second BS in the second direction. Beam shapes for each beam set of the active beams may vary. For example, as described above, the shape of control beams from a BS may be different than a shape of data beams from the same base station.

Figure 12:
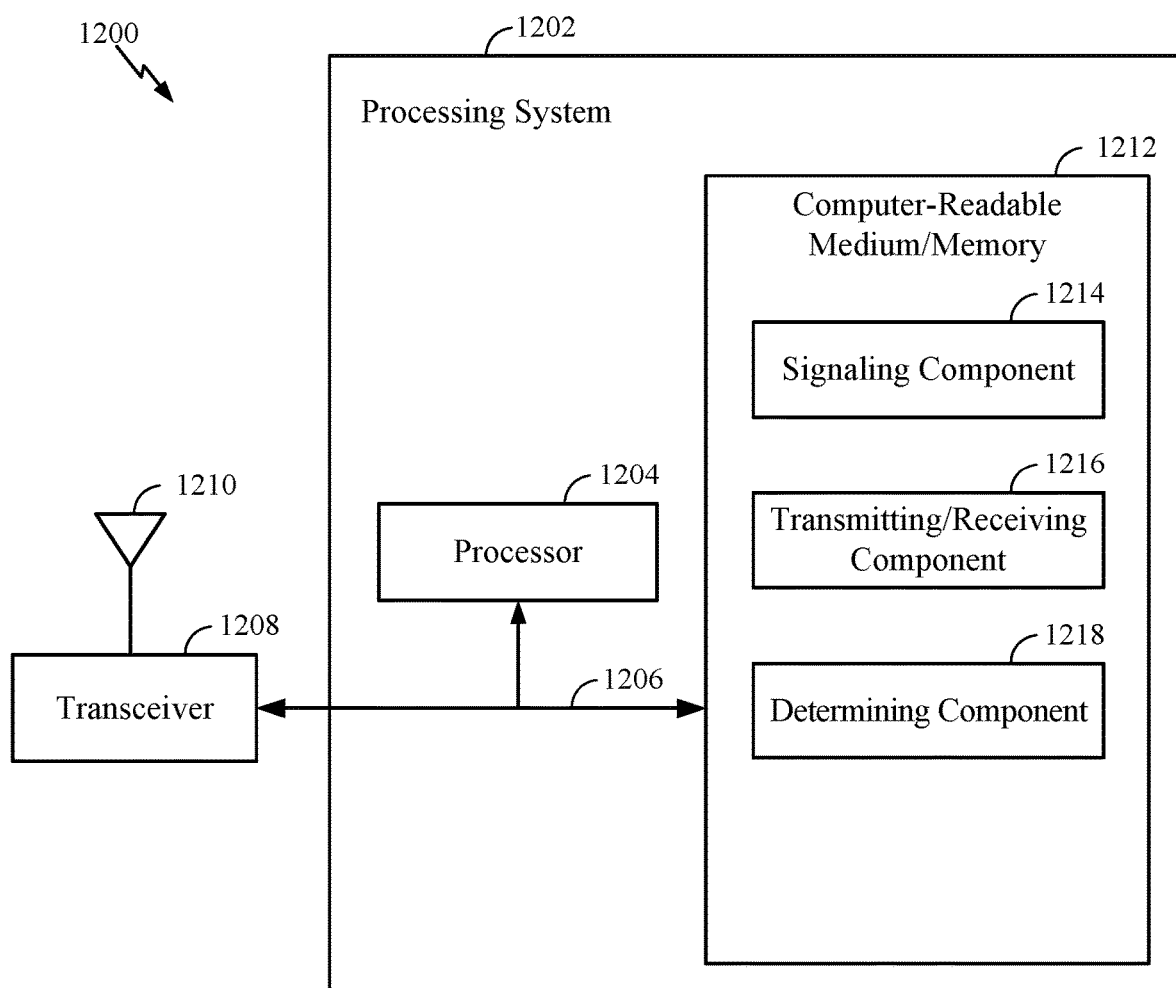
FIG. 12 illustrates a communications device that may include various components configured to perform operations for the techniques disclosed herein in accordance with aspects of the present disclosure.

FIG. 12 illustrates a communications device 1200 (e.g., BS 110 or UE 120) that may include various components (e.g., corresponding to means-plus-function components) configured to perform operations for the techniques disclosed herein, such as the operations illustrated in FIGS. 7-10. The communications device 1200 includes a processing system 1202 coupled to a transceiver 1208. The transceiver 1208 is configured to transmit and receive signals for the communications device 1200 via an antenna 1210, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions that when executed by processor 1204, cause the processor 1204 to perform the operations illustrated in FIGS. 7-10, or other operations for performing the various techniques discussed herein.

In certain aspects, the processing system 1202 further includes a signaling component 1214 for performing the operations illustrated in FIGS. 7-10. Additionally, the processing system 1202 includes a transmitting/receiving component 1216 for performing the operations illustrated in FIGS. 7-10. Additionally, the processing system 1202 includes a determining component 1218 for performing the operations illustrated in FIGS. 7-10. The signaling component 1214, transmitting/receiving component 1216, and determining component 1218 may be coupled to the processor 1204 via bus 1206. In certain aspects, the signaling component 1214, transmitting/receiving component 1216, and determining component 1218 may be hardware circuits. In certain aspects, the signaling component 1214, transmitting/receiving component 1216, and determining component 1218 may be software components that are executed and run on processor 1204.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a base station (BS), comprising:
   determining a set of transmission (TX) beams for simultaneous transmissions to a user equipment (UE);
   signaling to the UE an indication of the TX beams via downlink control information, wherein the indication of the TX beams is provided via a virtual transmission configuration indicator (TCI) state indicating a plurality of TCI states corresponding to the TX beams, wherein the plurality of TCI states comprises single-beam TCI states corresponding to each of the TX beams, and wherein at least one of the TCI states indicates at least one of at least one first reference signal for determining spatial reception parameters associated with the TX beams or at least one second reference signal for tracking the TX beams; and
   transmitting simultaneously via the TX beams.

2. The method of claim 1, further comprising receiving, from the UE, feedback information related to the TX beams.

3. The method of claim 1, wherein the at least one second reference signal comprises a common reference signal transmitted by each of the TX beams.

4. The method of claim 1, wherein the at least one second reference signal comprises a reference signal for each set of TX beams simultaneously received by a same reception (RX) beam at the UE.

5. The method of claim 4, further comprising receiving, from the UE, an indication of one or more RX beams at the UE corresponding to the TX beams.

6. The method of claim 1, wherein the virtual TCI state is a TCI codepoint indicating the single-beam TCI states corresponding to each of the TX beams.

7. A method of wireless communication by a base station (BS), comprising:
   determining a set of transmission (TX) beams for simultaneous transmissions to a user equipment (UE);
   signaling to the UE an indication of the TX beams via downlink control information, wherein the indication of the TX beams is provided via a virtual transmission configuration indicator (TCI) state indicating a plurality of TCI states corresponding to the TX beams, wherein the plurality of TCI states comprises single-beam TCI states corresponding to each of the TX beams, and wherein at least one of the TCI states comprises at least one of a first identifier of at least one reference signal for determining spatial reception parameters associated with the TX beams, a second identifier of a single-beam TCI state for determining the spatial reception parameters associated with the TX beams, a third identifier of a multi-beam TCI state for determining the spatial reception parameters associated with the TX beams, or a fourth identifier of at least one tracking reference signal; and
   transmitting simultaneously via the TX beams.

8. A method of wireless communication by a base station (BS), comprising:
   determining a set of transmission (TX) beams for simultaneous transmissions to a user equipment (UE);
   signaling to the UE an indication of the TX beams via downlink control information, wherein the indication of the TX beams is provided via a virtual transmission configuration indicator (TCI) state indicating a plurality of TCI states corresponding to the TX beams, wherein the plurality of TCI states comprises single-beam TCI states corresponding to each of the TX beams, and wherein the indication is provided via a multi-beam spatial relationship between the TX beams used by the UE on an uplink (UL) resource;
transmitting simultaneously via the TX beams; and
receiving simultaneous transmissions from the UE on the UL resource.

9. The method of claim 8, wherein the multi-beam spatial relationship indicates at least one of at least one first reference signal for determining spatial reception parameters associated with the TX beams or at least one second reference signal to estimate a path loss for power control associated with an UL multi-beam simultaneous transmission.

10. A method of wireless communication by a user equipment, comprising:
receiving, from a base station (BS), an indication of transmission (TX) beams for simultaneous transmissions to the UE via downlink control information, wherein the indication of the TX beams is provided via a virtual transmission configuration indicator (TCI) state indicating a plurality of TCI states corresponding to the TX beams, wherein the plurality of TCI states comprises single-beam TCI states corresponding to each of the TX beams, and wherein at least one of the TCI states indicates at least one of at least one first reference signal for determining spatial reception parameters associated with the TX beams or at least one second reference signal for tracking the TX beams; and
receiving transmissions based on the indication via one or more reception (RX) beams.

11. The method of claim 10, further comprising:
determining feedback information related to the TX beams based on the indication; and
transmitting, to the BS, the feedback information related to the TX beams.

12. The method of claim 10, wherein receiving transmissions comprises receiving the simultaneous transmissions from the BS.

13. The method of claim 10, wherein the at least one second reference signal comprises a common reference signal transmitted by each of the TX beams.

14. The method of claim 10, wherein the at least one second reference signal comprises a reference signal for each set of TX beams simultaneously received by a same reception (RX) beam at the UE.

15. The method of claim 14, further comprising transmitting, to the BS, an indication of each of the RX beams used to receive the TX beams.

16. The method of claim 10, wherein the virtual TCI state is a TCI codepoint indicating the single-beam TCI states corresponding to each of the TX beams.

17. A method of wireless communication by a user equipment, comprising:
receiving, from a base station (BS), an indication of transmission (TX) beams for simultaneous transmissions to the UE via downlink control information, wherein the indication of the TX beams is provided via a virtual transmission configuration indicator (TCI) state indicating a plurality of TCI states corresponding to the TX beams, wherein the plurality of TCI states comprises single-beam TCI states corresponding to each of the TX beams, and wherein at least one of the TCI states comprises at least one of a first identifier of at least one reference signal for determining spatial reception parameters associated with the TX beams, a second identifier of a single-beam TCI state for determining the spatial reception parameters associated with the TX beams, a third identifier of a multi-beam TCI state for determining the spatial reception parameters associated with the TX beams, or an identifier of at least one tracking reference signal; and
receiving transmissions based on the indication via one or more reception (RX) beams.

18. A method of wireless communication by a user equipment, comprising:
receiving, from a base station (BS), an indication of transmission (TX) beams for simultaneous transmissions to the UE via downlink control information, wherein the indication of the TX beams is provided via a virtual transmission configuration indicator (TCI) state indicating a plurality of TCI states corresponding to the TX beams, wherein the plurality of TCI states comprises single-beam TCI states corresponding to each of the TX beams, and wherein the indication is provided via a multi-beam spatial relationship between the TX beams used by the UE on an uplink (UL) resource; and
receiving transmissions based on the indication via one or more reception (RX) beams transmitting the simultaneous transmissions from the UE on the UL resource.

19. The method of claim 18, wherein the multi-beam spatial relationship indicates at least one of at least one first reference signal for determining spatial reception parameters associated with the TX beams or at least one second reference signal to estimate a path loss for power control associated with an UL multi-beam simultaneous transmission.

20. An apparatus for wireless communication, comprising:
a processing system configured to determine a set of transmission (TX) beams for simultaneous transmissions to a user equipment (UE); and
a transmitter configured to:
signal to the UE an indication of the TX beams via downlink control information, wherein the indication of the TX beams is provided via a virtual transmission configuration indicator (TCI) state indicating a plurality of TCI states corresponding to the TX beams, wherein the plurality of TCI states comprises single-beam TCI states corresponding to each of the TX beams, and wherein at least one of the TCI states indicates at least one of at least one first reference signal for determining spatial reception parameters associated with the TX beams or at least one second reference signal for tracking the TX beams, and
transmit simultaneously via the TX beams.

21. The apparatus of claim 20, wherein the virtual TCI state is a TCI codepoint indicating the single-beam TCI states corresponding to each of the TX beams.

22. An apparatus for wireless communication, comprising:
a receiver configured to receive, from a base station (BS), an indication of transmission (TX) beams for simultaneous transmissions to the UE via downlink control information, wherein the indication of the TX beams is provided via a virtual transmission configuration indicator (TCI) state indicating a plurality of TCI states corresponding to the TX beams, wherein the plurality of TCI states comprises single-beam TCI states corresponding to each of the TX beams, and wherein at least one of the TCI states indicates at least one of at least one first reference signal for determining spatial reception parameters associated with the TX beams or at least one second reference signal for tracking the TX beams, and receive transmissions based on the indication via one or more reception (RX) beams.

23. The apparatus of claim 22, wherein the virtual TCI state is a TCI codepoint indicating single-beam TCI states corresponding to each of the TX beams.

* * * * *